US009952070B2

(12) United States Patent
Lee

(10) Patent No.: US 9,952,070 B2
(45) Date of Patent: Apr. 24, 2018

(54) APPARATUS AND METHOD FOR DETERMINING IMMERSION RISK OF MOBILE TERMINAL USER

(71) Applicant: SAMSUNG ELECTRONICS CO., LTD., Suwon-si (KR)

(72) Inventor: Ho-Sub Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1090 days.

(21) Appl. No.: 13/905,244

(22) Filed: May 30, 2013

(65) Prior Publication Data

US 2013/0346012 A1    Dec. 26, 2013

(30) Foreign Application Priority Data

Jun. 21, 2012   (KR) ........................ 10-2012-0066856

(51) Int. Cl.
*G01D 21/02*      (2006.01)
*G01D 9/00*       (2006.01)

(52) U.S. Cl.
CPC ............. *G01D 9/005* (2013.01); *G01D 21/02* (2013.01)

(58) Field of Classification Search
CPC ...... G01D 9/005; G01D 21/02; A61B 5/1118; A61B 5/168; A61B 5/6887
USPC ....................................................... 702/127
See application file for complete search history.

(56) References Cited

U.S. PATENT DOCUMENTS

| 8,106,756 | B2 | 1/2012 | Yoon et al. |
| 2002/0173928 | A1* | 11/2002 | Willner ............... A61B 5/0002 702/127 |
| 2008/0221472 | A1* | 9/2008 | Lee ..................... A61B 5/0476 600/544 |
| 2012/0140069 | A1* | 6/2012 | Ding ..................... H04H 60/31 348/143 |

FOREIGN PATENT DOCUMENTS

| JP | 2003-111106 A | 4/2003 |
| JP | 2006-277209 A | 10/2006 |
| KR | 10-0753839 B1 | 8/2007 |
| KR | 10-2009-0022528 A | 3/2009 |
| KR | 10-2011-0127025 A | 11/2011 |
| KR | 10-2012-0021550 A | 3/2012 |

* cited by examiner

*Primary Examiner* — Yoshihisa Ishizuka
(74) *Attorney, Agent, or Firm* — NSIP Law

(57) ABSTRACT

An apparatus that determines an immersion risk of a mobile terminal user, includes an immersion determination unit configured to determine whether the user is immersed in a mobile terminal based on data of the user, and calculate an immersion frequency based on a result of the determination. The apparatus further includes an immersion risk determination unit configured to calculate a degree of the immersion risk based on the immersion frequency, and determine whether the immersion risk is present based on the degree of the immersion risk.

20 Claims, 6 Drawing Sheets

FIG. 4

| | MEASUREMENT DATA DURING IMMERSION DETERMINATION CYCLE | | | | MEASUREMENT DATA AT IMMERSION DETERMINATION | | | IMMERSION DETERMINATION RESULT |
|---|---|---|---|---|---|---|---|---|
| | TEXT INPUT SPEED (AVERAGE) | INPUT TEXT LENGTH | TOUCH FREQUENCY | DEGREE OF SHAKING | USE OF HEADSET | SOUND VOLUME | ILLUMINANCE | |
| RECORD #1 | 17.2 | 26 | 13 | 7 | Yes | 8 | 50 | IMMERSION |
| RECORD #2 | 7.5 | 11 | 3 | 15 | No | 0 | 70 | NON-IMMERSION |
| ... | ... | ... | ... | ... | ... | ... | ... | ... |
| RECORD #N | 23.5 | 21 | 15 | 9 | Yes | 5 | 30 | IMMERSION |

FIG. 5

| SOFTWARE FUNCTION | IMMERSION INDEX REFERENCE VALUE (0 ~ 10) |
|---|---|
| CHAT | 9 |
| GAME | 8.5 |
| TV | 8 |
| INTERNET | 6 |
| ... | ... |
| WEATHER | 3 |

APPARATUS AND METHOD FOR DETERMINING IMMERSION RISK OF MOBILE TERMINAL USER

CROSS-REFERENCE TO RELATED APPLICATION

This application claims the benefit under 35 USC 119(a) of Korean Patent Application No. 10-2012-0066856, filed on Jun. 21, 2012, the entire disclosure of which is incorporated herein by reference for all purposes.

BACKGROUND

1. Field

The following description relates to an apparatus and a method for determining an immersion risk of a mobile terminal user.

2. Description of the Related Art

The number of users that enjoy a variety of contents or applications using mobile terminals, such as smartphones and tablet personal computers (PCs), has increased. Contents and applications for mobile terminals have diversified in quantity and in quality with the rapid development of software and hardware performance of the mobile terminals. Accordingly, users may easily become visually, aurally and tactually immersed in the mobile terminals.

However, when the users are immersed in the mobile terminals, it may cause many physical and mental problems. For example, compared to the case of normal users, when a child is immersed in mobile terminals for a long time, brain activity in the right side frontal lobe decreases, which may cause mental problems, such as attention deficit disorder. In addition, when a user is immersed in a mobile terminal with poor posture for a long time, the user may experience physical problems, such as scoliosis. In the case of adult users, immersing themselves in mobile terminals while on the move can lead to a variety of accidents due to carelessness during walking.

In this manner, with the development of mobile terminal technology and diversification of contents for mobile terminals, environments in which users can easily become immersed in the mobile terminals have been increasingly created. Therefore, there is a demand for technology in which a mobile terminal may intelligently determine whether a user is immersed in the mobile terminal so as to take steps to assure the safety of the user.

SUMMARY

In one general aspect, there is provided an apparatus that determines an immersion risk of a mobile terminal user, the apparatus including an immersion determination unit configured to determine whether the user is immersed in a mobile terminal based on data of the user, and calculate an immersion frequency based on a result of the determination. The apparatus further includes an immersion risk determination unit configured to calculate a degree of the immersion risk based on the immersion frequency, and determine whether the immersion risk is present based on the degree of the immersion risk.

In another general aspect, there is provided a method of determining an immersion risk of a mobile terminal user, the method including determining whether the user is immersed in a mobile terminal based on data of the user, and calculating an immersion frequency based on a result of the determination. The method further includes calculating a degree of immersion risk based on the immersion frequency, and determining whether the immersion risk is present based on the degree of the immersion risk.

Other features and aspects will be apparent from the following detailed description, the drawings, and the claims.

BRIEF DESCRIPTION OF THE DRAWINGS

FIG. 4 is a diagram illustrating an example of training data.

FIG. 5 is a diagram illustrating an example of a reference value of an immersion index for each software function.

DETAILED DESCRIPTION

Figure 1:
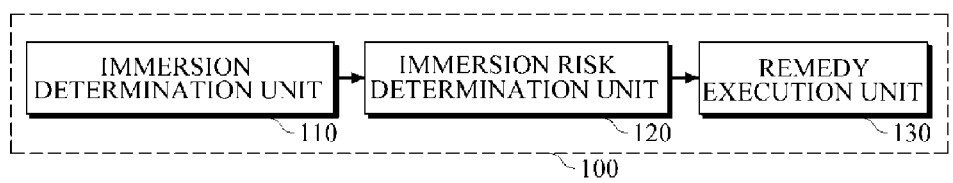
FIG. 1 is a block diagram illustrating an example of an apparatus that determines an immersion risk of a mobile terminal user.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a block diagram illustrating an example of an apparatus 100 that determines an immersion risk of a mobile terminal user. Referring to FIG. 1, the immersion risk determination apparatus 100 may be applied to a mobile terminal. For example, the mobile terminal may be a mobile phone, a smartphone, a personal digital assistant (PDA), a portable media player (PMP), a tablet PC, and/or other devices known to one of ordinary skill in the art. The immersion risk determination apparatus 100 includes an immersion determination unit 110, an immersion risk determination unit 120, and a remedy execution unit 130.

The immersion determination unit 110 determines whether the user is currently immersed in the mobile terminal. That is, when the user executes a software function of the mobile terminal, for example, at least one of a variety of applications or contents executed in the mobile terminal, such as an operating system (OS), chat software, the Internet, and game software, the immersion determination unit 110 determines whether the user is immersed in the mobile terminal based on use data of the mobile terminal that is collected from a variety of sensors mounted in the mobile terminal. The use data may be usage history data (e.g., an accumulated or total use time and a use frequency) of the software function for the user, behavior and situation-related data of the user, and/or other data known to one of ordinary skill in the art, which are collected while the user executes the software function. For example, the behavior-related data may include a degree of shaking of the mobile terminal that is measured by an accelerometer, a degree of inclination of the mobile terminal that is measured by an orientation sensor, the use frequency of the software function that is measured by a software sensor (e.g., the OS), a text input speed, and an input text length. In this example, the user situation-related data may include a current location of the user that is measured by a global positioning system (GPS) and ambient illuminance measured by an illumination sensor.

The immersion determination unit 110 further determines whether the user is immersed in the mobile terminal based on the use data collected during a predetermined immersion determination cycle when the software function is executed. The immersion determination unit 110 further calculates an accumulated immersion frequency of the software function based on one or more results of the determination of whether the user is immersed in the mobile terminal.

The immersion risk determination unit 120 determines whether an immersion risk of the user is present based on the accumulated immersion frequency. The immersion risk determination unit 120 may determine whether the immersion risk is present further based on the usage history data of the software function and/or an age of the user. By comprehensively considering both objective data indicating actual immersion behavior of the user, such as the accumulated immersion frequency (i.e., direct information), and related data indicating an immersion possibility of the user, such as the usage history data and/or the age of the user (i.e., indirect information), an accuracy and a reliability of the determination of the immersion risk may be improved.

The remedy execution unit 130 executes a remedy (e.g., an appropriate action) for the immersion risk of the user when the immersion risk determination unit 120 determines that the immersion risk is present. For example, the remedy may include displaying a predetermined warning message to the user, playing a warning sound for the user, generating a vibration in the mobile terminal, terminating the current software function, shutting off power of the mobile terminal, and/or other actions known to one of ordinary skill in the art, thereby preventing the immersion risk. In addition, the remedy may include predetermined automatic communication (for example, a transmission of an emergency message and/or an emergency telephone connection) with another mobile terminal set in advance, such as a mobile phone of a guardian.

Figure 2:
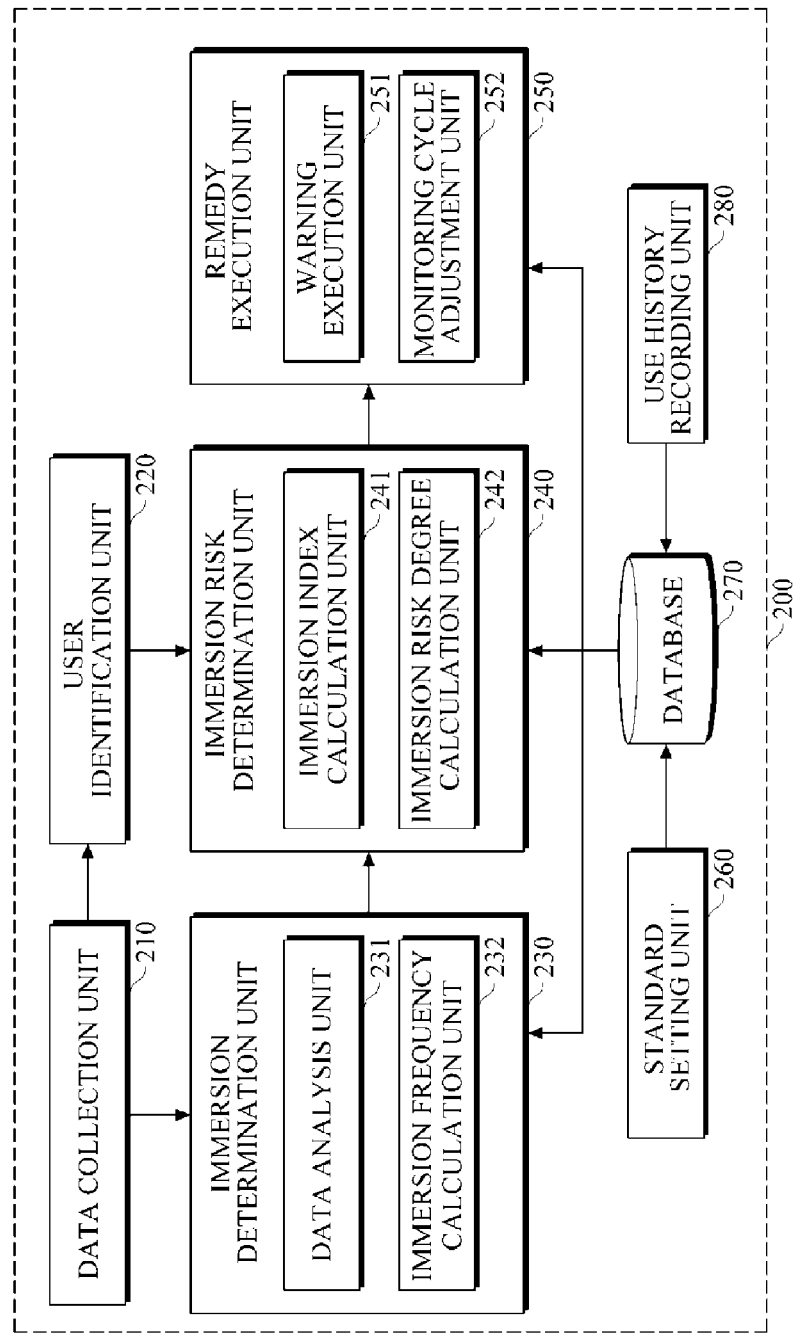
FIG. 2 is a block diagram illustrating another example of an apparatus that determines an immersion risk of a mobile terminal user.

FIG. 2 is a block diagram illustrating another example of an apparatus 200 that determines an immersion risk of a mobile terminal user. Referring to FIG. 2, the immersion risk determination apparatus 200 includes a data collection unit 210, a user identification unit 220, an immersion determination unit 230, an immersion risk determination unit 240, a remedy execution unit 250, a standard setting unit 260, a database 270, and a use history recording unit 280.

The data collection unit 210 collects use data of a mobile terminal that includes, for example, usage history data (e.g., an accumulated or total use time and a use frequency) of a software function of the mobile terminal that is currently-used by the user, behavior and situation-related data of the user, and/or other data known to one of ordinary skill in the art, as described above. The data collection unit 210 collects the use data through sensors mounted in the mobile terminal when the user executes the software function, as described with reference to FIG. 3.

Figure 3:
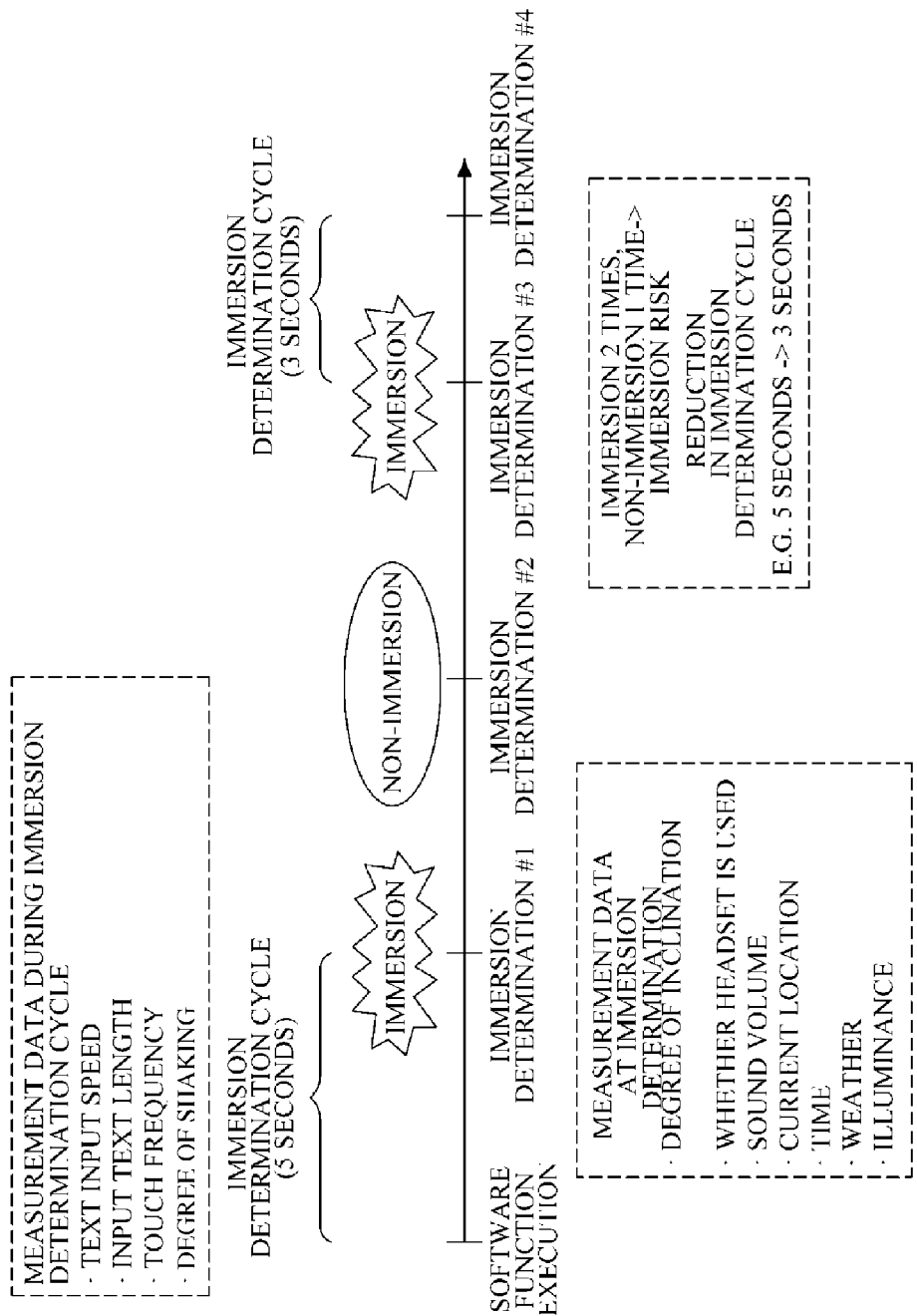
FIG. 3 is a diagram illustrating an example of a method of determining an immersion risk of a mobile terminal user.

FIG. 3 is a diagram illustrating an example of a method of determining an immersion risk of a mobile terminal user. Referring to FIGS. 2 and 3, the data collection unit 210 collects measurement data changed in real-time during an immersion determination cycle, such as, for example, a text input speed (e.g., an average text input speed), an input text length, a touch frequency, a degree of shaking of the mobile terminal, and/or other data known to one of ordinary skill in the art. The immersion determination cycle may be a period of time (e.g., 5 seconds) between a start of the execution of the software function of the mobile terminal (e.g., a software function execution) that is currently-used by the user and a first determination of whether the user is immersed in the mobile terminal (e.g., an immersion determination #1). The immersion determination cycle may also be a period of time (e.g., 3 seconds) between immersion determinations (e.g., immersion determinations #3 and #4). The data collection unit 210 further collects measurement data changed little during the immersion determination cycle, such as, for example, a degree of inclination of the mobile terminal, whether a headset is used, a sound volume, a current location, illuminance, a time, weather, and/or other data known to one of ordinary skill in the art, at a time of an immersion determination, e.g., the immersion determination #1.

Referring again to FIG. 2, the immersion determination unit 230 includes a data analysis unit 231 and an immersion frequency calculation unit 232. The data analysis unit 231 analyzes the use data of the mobile terminal that is collected by the data collection unit 210 during the immersion determination cycle and at a time of an immersion determination to determine whether the user is immersed in the mobile terminal. For example, referring again to FIGS. 2 and 3, the data analysis unit 231 determines that the user is immersed in the mobile terminal at times of the immersion determinations #1 and #3, respectively, and determines that the user is not immersed in the mobile terminal at a time of an immersion determination #2.

Referring again to FIG. 2, the data analysis unit 231 may determine whether the user is immersed in the mobile terminal by classifying the collected use data of the mobile terminal into a predetermined state (e.g., an immersion or non-immersion state) based on a machine learning method or a supervised machine learning method. The supervised machine learning method may be a decision tree, a naive Bayes classification, or a support vector machine (SVM).

FIG. 4 is a diagram illustrating an example of training data. Referring to FIG. 4, each record of the training data includes the measurement data collected during the immersion determination cycle, the measurement data collected at a time of an immersion determination, and a result of the immersion determination, as described above. The result of the immersion determination is set as a binary classification of immersion or non-immersion, but may be set as a ternary classification of a high/medium/low degree of immersion.

Referring again to FIG. 2, the training data may be collected and determined in advance and stored in the database 270. The training data may be periodically collected and determined to update the database 270.

The immersion frequency calculation unit 232 calculates (e.g., increments) an accumulated immersion frequency each time the data analysis unit 231 determines that the user is immersed in the mobile terminal. That is, immersion frequency calculation unit 232 calculates the accumulated immersion frequency (e.g., a number of times the data analysis unit 231 determines that the user is immersed in the mobile terminal) of the software function currently-used by the user. For example, referring again to FIG. 3, the accumulated immersion frequency of the software function is calculated as "1" at the time of the immersion determination #1, and is calculated as "2" at the time of the immersion determination #3.

Referring again to FIG. 2, the immersion risk determination unit 240 includes an immersion index calculation unit 241 and an immersion risk degree calculation unit 242. The immersion risk determination unit 240 calculates an immersion index when the immersion determination unit 230 determines that the user is immersed in the mobile terminal, e.g., at each of the times of the immersion determinations #1 and #3 of FIG. 3. The immersion risk determination unit 240 further calculates a degree of the immersion risk of the user based on the immersion index and the accumulated immersion frequency. The immersion risk determination unit 240 further determines whether the immersion risk of the user is present based on the degree of the immersion risk.

In more detail, the immersion index calculation unit 241 calculates the immersion index when the immersion determination unit 230 determines that the user is immersed in the mobile terminal. That is, the immersion index calculation unit 241 calculates the immersion index of the software function currently-used by the user, and the immersion index corresponds to a possibility of an immersion of the user in the software function. The immersion index calculation unit 241 may calculate the immersion index based on the usage history data (e.g., the accumulated or total use time and the use frequency) of the software function, a reference value of the immersion index for the software function, and/or the age of the user, as expressed in the following example of Equation 1:

$$\text{immersion\_index} = \frac{\text{reference\_value\_of\_immersion\_index} \times \text{accumulated\_use\_time} \times \text{use\_frequency}}{\text{user\_age}} \quad (1)$$

The data collection unit 210 collects the usage history data of each software function is collected through a software sensor (e.g., an OS) The usage history data may include, for example, operating times of the OS, an accumulated or total use time of each software function, and a use frequency of each software function. As shown in Equation 1, if the accumulated use time or the use frequency of the software function is increased, the immersion index of the software function is increased accordingly.

FIG. 5 is a diagram illustrating an example of a reference value of an immersion index for each software function. Referring to FIG. 5, the reference value of the immersion index for each software function may be set differently by the user. By reflecting that mobile terminal usage patterns differ for each user, the immersion index of each software function may be estimated more accurately.

For example, the reference value of the immersion index for each software function may be set in a range from "0" to "10". If a reference value of an immersion index for a software function is increased, a possibility of an immersion of the user in the software function is increased.

In this example, the reference value of the immersion index for each software function with respect to a relatively young user, such as a student, is shown. In more detail, the student tends to be easily immersed in chat software and game software. Therefore, the reference values of the chat software and the game software, respectively, are set to be relatively high, and weather software is set to be relatively low. In contrast, in an example of a relatively old user, the reference values may be set in the opposite manner.

Referring again to FIG. 2, the standard setting unit 260 sets the reference value of the immersion index for each software function in advance based on an input of the user. The standard setting unit 260 may store the reference value for each software function in the database 270.

The user identification unit 220 identifies the age of the user. The user identification unit 220 may directly receive the age of the user based on an input of the user. As discussed above, the age of the user is used to calculate the immersion index of the software function currently-used by the user, because a relatively young user tends to be easily immersed in the mobile terminal.

In an example, the data collection unit 210 may collect a current face image of the user through a camera, and the user identification unit 220 may analyze the current face image to identify an identity and the age of the user. If pieces of user information, such as a face image, an identity, and an age, are registered in advance in the mobile terminal, the user identification unit 220 may compare the current face image collected by the data collection unit 210 and the face image registered in advance to thereby identify the identity and the age of the user. If the user information is not registered in advance, the user identification unit 220 may determine that the collected current face image is of an unidentified user, and may estimate an age of the unidentified user based on features of the current face image, e.g., wrinkles. Since technologies that estimate an age of a user based on features of a face image of the user are well-known, detailed descriptions thereof will be omitted for conciseness. Based on the identified age of the user, the immersion index of the software function may be calculated and used to accurately determine whether the immersion risk of the user is present.

The immersion risk degree calculation unit 242 calculates the degree of the immersion risk of the user based on the accumulated immersion frequency of the software function that is currently-used by the user that is calculated by the immersion determination unit 230, and/or the immersion index of the software function that is calculated by the immersion index calculation unit 241. In addition, the immersion risk determination unit 240 compares the degree of the immersion risk to a predetermined threshold, to determine whether the immersion risk is present. For example, the immersion risk determination unit 240 may determine that the immersion risk is present when the degree of the immersion risk is greater than the predetermined threshold.

Referring again to FIGS. 2 and 3, the immersion risk degree calculation unit 242 calculates the degree of the immersion risk at each of the times of the immersion determinations #1 and #3. The immersion risk determination unit 240 determines whether the immersion risk is present based on the degree of the immersion risk at each of the times of the immersion determinations #1 and #3. In this example, the immersion risk determination unit 240 determines that the immersion risk is present at the time of the immersion determination #3.

The degree of the immersion risk may calculated based on the following example of Equation 2:

$$\text{degree\_of\_immersion\_risk} = \text{immersion\_index} \times \text{immersion\_frequency} \quad (2)$$

Referring again to FIG. 2, the remedy execution unit 250 includes a warning execution unit 251 and a monitoring cycle adjustment unit 252. The warning execution unit 251 executes one or more warnings for the user, which notify the user of the immersion risk, when the immersion risk determination unit 240 determines the immersion risk is present.

The monitoring cycle adjustment unit 252 adjusts the immersion determination cycle between immersion determinations of the immersion determination unit 230, when the immersion risk determination unit 240 determines the immersion risk is present. For example, the monitoring cycle adjustment unit 252 may adjust the immersion determination cycle to be shorter. Accordingly, whether the user is immersed in the mobile terminal and whether the immersion risk of the user is present may be determined more frequently, and the user may be notified of the immersion risk more frequently. Therefore, the user may use the mobile terminal more safely.

For example, referring again to FIG. 3, it is determined that the immersion risk of the user is present at the time of the immersion determination #3, the immersion determination cycle is adjusted from five seconds to three seconds. Therefore, it may be determined whether the user is immersed in the mobile terminal at three second intervals starting from the time of the immersion determination #4.

Referring again to FIG. 2, the standard setting unit 260 sets standard information for the immersion determination unit 230, the immersion risk determination unit 240, and the remedy execution unit 250 based on an input of the user, and may store the standard information in the database 270. For example, the standard information may include the immersion determination cycle, the reference value of the immersion index for each software function, the predetermined threshold of the degree of the immersion risk, a remedy for the immersion risk (e.g., the reduction of the immersion determination cycle), and/or other information known to one of ordinary skill in the art and discussed above.

The use history recording unit 280 collects the usage history data of each software function used by each user of the mobile terminal. As discussed above, the collected usage history data is used to calculate the immersion index of the software function currently used by the user. The use history recording unit 280 may further store and manage the collected usage history data of each software function used by each user in the database 270. When the single mobile terminal is used by a plurality of users, the usage history data may be separately managed for each user so as to calculate a more accurate immersion index for each user. The use history recording unit 280 may receive the usage history data of the software function currently-used by the user from the OS when the user whose identity is identified by the user identification unit 220 uses the software function, and may store the received usage history data in the database 270.

Figure 6:
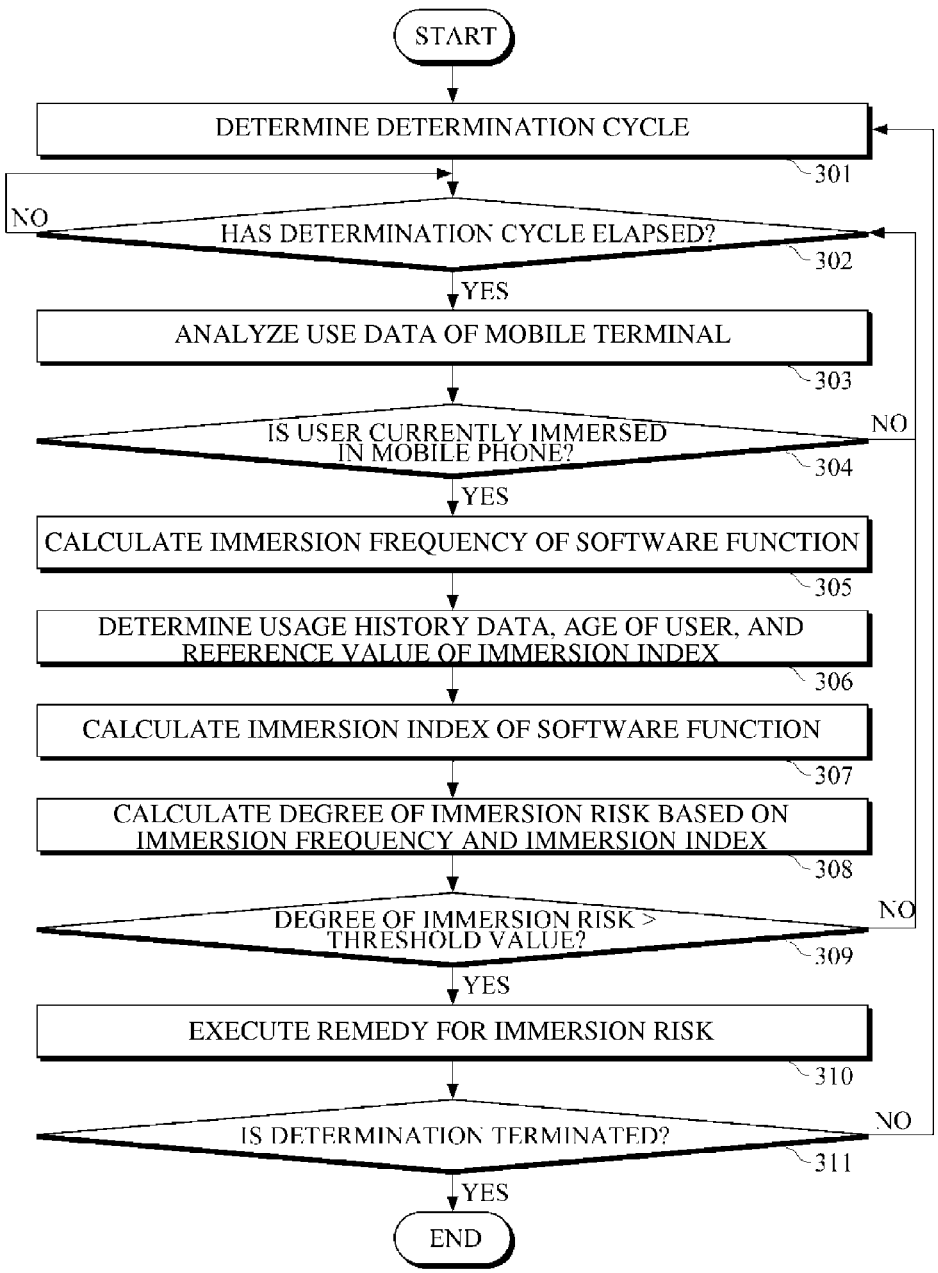
FIG. 6 is a flowchart illustrating an example of a method of determining an immersion risk of a mobile terminal user.

FIG. 6 is a flowchart illustrating an example of a method of determining an immersion risk of a mobile terminal user. The method of determining the immersion risk may be performed by the immersion risk determination apparatus 200 of FIG. 2, and therefore, description of the method will be made with reference to FIGS. 2 through 5.

Referring to FIGS. 2 and 6, in operation 301, the immersion risk determination apparatus 200 determines an immersion determination cycle set in advance when the user uses a mobile terminal. The immersion risk determination apparatus 200 may set in advance and adjust the immersion determination cycle based on an input of the user, and may automatically adjust the immersion determination cycle when the immersion risk determination apparatus 200 determines the immersion risk of the user is present.

In operation 302, the immersion risk determination apparatus 200 determines whether the immersion determination cycle has elapsed. When the immersion determination cycle has elapsed, the method continues in operation 303. Otherwise, the method returns to operation 301.

In operation 303, the immersion risk determination apparatus 200 analyzes use data of the mobile terminal that is collected during the immersion determination cycle and at a time that the immersion determination cycle has elapsed, e.g., of an immersion determination.

In operation 304, the immersion risk determination apparatus 200 determines whether the user is currently immersed in the mobile terminal or phone based on results of the analysis. The immersion risk determination apparatus 200 may determine whether the user is current immersed in the mobile terminal by classifying the use data of the mobile terminal into a predetermined state (e.g., an immersion or non-immersion state) based on a supervised machine learning method. Referring again to FIG. 6, when the user is immersed in the mobile terminal, the method continues in operation 305. Otherwise, the immersion risk determination apparatus 200 waits until a next immersion determination cycle starts, and the method returns to operation 302.

In operation 305, the immersion risk determination apparatus 200 calculates an accumulated immersion frequency of a software function of the mobile terminal that is currently-used by the user.

In operation 306, the immersion risk determination apparatus 200 determines usage history data of the software function, an age of the user, and a reference value of an immersion index of the software function, which may be set in advance. For example, the reference value of the immersion index of the software function may be set differently based on characteristics (e.g., the age, a gender, and an occupation) of the user.

In operation 307, the immersion risk determination apparatus 200 calculates the immersion index of the software function based on the accumulated immersion frequency, the usage history data, the age of the user, and/or the reference value of the immersion index. For example, the immersion index (e.g., a possibility of an immersion of the user in the software function) may be calculated based on Equation 1, and Equation 1 shows that the immersion index is relatively large when the user is relatively young. In addition, since the reference value of the immersion index may be set differently based on the characteristics of the user, the immersion index may be determined based on the characteristics of the user.

In operation 308, the immersion risk determination apparatus 200 calculates a degree of the immersion risk of the user based on the accumulated immersion frequency and/or immersion index. For example, the degree of the immersion risk may be calculated based on Equation 2, thereby providing a reliable result of the determination of whether the immersion risk of the user is present.

In operation 309, the immersion risk determination apparatus 200 determines whether the degree of the immersion risk is greater than a predetermined threshold value. When the degree of the immersion risk exceeds the threshold value, the immersion risk determination apparatus 200 determines that the immersion risk of the user is present, and the method continues in operation 310. Otherwise, the method returns to operation 302. The predetermined threshold value may be set by the user, and/or may be set based on the characteristics of the user.

In operation 310, the immersion risk determination apparatus 200 executes a remedy (e.g., a predetermined action) for the immersion risk of the user. The remedy may include, for example, displaying the degree of the immersion risk to the user, displaying a warning message to the user, playing a warning sound for the user, terminating the software function, shutting off power of the mobile terminal, automatically performing communication with a predetermined telephone number, adjusting the immersion determination cycle to be shorter so that whether the user is immersed in the mobile terminal may be more frequently determined, and/or other actions known to one of ordinary skill in the art and discussed above.

In operation 311, the immersion risk determination apparatus 200 determines whether the determination of the immersion risk of the user is terminated. For example, the determination of the immersion risk is terminated when the user stops using the mobile terminal due to a warning of the immersion risk. The determination of the immersion risk may not be terminated when the user continues to use the mobile terminal even after the remedy for the immersion risk is executed. When the determination of the immersion risk is not terminated, the method returns to operation 301. In this example, the immersion determination cycle may be adjusted to be shorter, the user may receive the warning of the immersion risk more frequently, and therefore, the user may be prevented from becoming further immersed in the mobile terminal. Otherwise, the method ends.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a terminal described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus that determines an immersion risk of a mobile terminal user, the apparatus comprising:
   an immersion determiner configured to
      determine whether the user is immersed in a mobile terminal based on data of the user, and
      calculate an immersion frequency based on a result of the determination;
   an immersion risk determiner configured to
      calculate a degree of the immersion risk based on the immersion frequency, and
      determine whether the immersion risk is present based on the degree of the immersion risk; and
   a remedy executor configured to, in response to determining that the immersion risk is present, shut off power of the mobile terminal,
   wherein the remedy executor adjusts a length of an immersion determination cycle based on the immersion frequency.

2. The apparatus according to claim 1, wherein the immersion risk determiner is further configured to:
   calculate an immersion index indicating a possibility that the user becomes immersed in the mobile terminal; and
   calculate the degree of the immersion risk based on the immersion frequency and/or the immersion index.

3. The apparatus according to claim 1, wherein the immersion risk determiner is further configured to:
   calculate an immersion index of a function being currently executed by the mobile terminal based on usage history data of the function, a reference value of the immersion index for the function, an age of the user, or any combination thereof; and
   calculate the degree of the immersion risk based on the immersion frequency and/or the immersion index,
   wherein the immersion index indicates a possibility that the user becomes immersed in the function.

4. The apparatus according to claim 3, wherein the usage history data of the function comprises operating times of an operating system, a total use time of the function, a frequency of use of the function, or any combination thereof.

5. The apparatus according to claim 3, further comprising:
   a data collector configured to collect a face image of the user through a camera; and
   a user identifier configured to identify the age of the user based on the face image.

6. The apparatus according to claim 1, wherein the remedy comprises displaying a warning message, playing a warning sound, generating a vibration, terminating a function of the mobile terminal that is currently being used by the user, powering off the mobile terminal, communicating with another mobile terminal identified in advance, adjusting a cycle of the determination of whether the user is immersed in the mobile terminal, or any combination thereof.

7. The apparatus according to claim 1, wherein the immersion determiner is further configured to:
   repeatedly determine whether the user is immersed in the mobile terminal during a plurality of immersion determination cycles; and
   classify immersion data collected during a cycle of the plurality of immersion determination cycles into a predetermined state based on a supervised machine learning method, to determine whether the user is immersed in the mobile terminal.

8. The apparatus according to claim 1, wherein the immersion determiner is further configured to:
   upon determining that the user is immersed in a function of the mobile terminal, increment the immersion frequency.

9. The apparatus according to claim 1, wherein the immersion risk determiner is further configured to:
   compare the degree of the immersion risk to a threshold, to determine whether the immersion risk is present.

10. The apparatus according to claim 1, wherein the data comprises a speed of text input, a length of input text, a touch frequency, a degree of shaking of the mobile terminal, a degree of inclination of the mobile terminal, whether a headset is used, a sound volume, a current location, a time, weather, illuminance, or any combination thereof, and wherein the data is measured by one or more sensors mounted in the mobile terminal.

11. A method of determining an immersion risk of a mobile terminal user, the method comprising:
   determining whether the user is immersed in a mobile terminal based on data of the user;
   calculating an immersion frequency based on a result of the determination;
   calculating a degree of immersion risk based on the immersion frequency;
   determining whether the immersion risk is present based on the degree of the immersion risk;
   in response to determining that the immersion risk is present, shutting off power of the mobile terminal; and
   adjusting a length of an immersion determination cycle based on the immersion frequency.

12. The method according to claim 11, further comprising:
calculating an immersion index indicating a possibility that the user becomes immersed in the mobile terminal; and
calculating the degree of the immersion risk based on the immersion frequency and/or the immersion index.

13. The method according to claim 11, further comprising:
calculating an immersion index of a function being currently executed by the mobile terminal based on usage history data of the function, a reference value of the immersion index for the function, an age of the user, or any combination thereof; and
calculating the degree of the immersion risk based on the immersion frequency and/or the immersion index,
wherein the immersion index indicates a possibility that the user becomes immersed in the function.

14. The method according to claim 13, wherein the usage history data of the function comprises operating times of an operating system, a total use time of the function, a frequency of execution of the function, or any combination thereof.

15. The method according to claim 13, further comprising:
collecting a face image of the user through a camera; and
identifying the age of the user based on the face image.

16. The method according to claim 11, wherein the remedy comprises displaying a warning message, playing a warning sound, generating a vibration, terminating a function of the mobile terminal that is currently being used by the user, powering off the mobile terminal, communicating with another mobile terminal identified in advance, adjusting a cycle of the determination of whether the user is immersed in the mobile terminal, or any combination thereof.

17. The method according to claim 11, further comprising:
repeatedly determining whether the user is immersed in the mobile terminal during a plurality of immersion determination cycles; and
classifying immersion data collected during a cycle of the plurality of immersion determination cycles into a predetermined state based on a supervised machine learning method, to determine whether the user is immersed in the mobile terminal.

18. The method according to claim 11, further comprising:
upon determining that the user is immersed in a function of the mobile terminal, incrementing the immersion frequency.

19. The method according to claim 11, further comprising:
comparing the degree of the immersion risk to a predetermined threshold, to determine whether the immersion risk is present.

20. The method according to claim 11, wherein the data comprises a speed of text input, a length of input text, a touch frequency, a degree of shaking of the mobile terminal, a degree of inclination of the mobile terminal, whether a headset is used, a sound volume, a current location, a time, weather, illuminance, or any combination thereof, and wherein the data is measured by one or more sensors mounted in the mobile terminal.

* * * * *